(12) United States Patent
Johnson et al.

(10) Patent No.: US 7,234,862 B2
(45) Date of Patent: Jun. 26, 2007

(54) APPARATUS FOR MEASURING TEMPERATURES OF A WAFER USING SPECULAR REFLECTION SPECTROSCOPY

(75) Inventors: Shane R. Johnson, Chandler, AZ (US); Yong-Hang Zhang, Scottsdale, AZ (US); Wayne L. Johnson, Phoenix, AZ (US)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 10/398,652

(22) PCT Filed: Oct. 12, 2001

(86) PCT No.: PCT/US01/27767

§ 371 (c)(1),
(2), (4) Date: Aug. 29, 2003

(87) PCT Pub. No.: WO02/00333

PCT Pub. Date: Apr. 25, 2002

(65) Prior Publication Data

US 2004/0061057 A1    Apr. 1, 2004

Related U.S. Application Data

(60) Provisional application No. 60/239,922, filed on Oct. 13, 2000.

(51) Int. Cl.
*G01J 5/00*     (2006.01)
*G01K 13/00*    (2006.01)

(52) U.S. Cl. .................. 374/131; 374/121; 374/141

(58) Field of Classification Search ................ 374/161, 374/120, 121, 141, 131
See application file for complete search history.

(56) References Cited

U.S. PATENT DOCUMENTS

| | | | |
|---|---|---|---|
| 4,311,725 A | * | 1/1982 | Holland ........................ 427/10 |
| 4,389,970 A | * | 6/1983 | Edgerton ..................... 118/666 |
| 4,576,485 A | | 3/1986 | Lambert |
| 4,671,651 A | | 6/1987 | Toyoda et al. |
| 4,749,254 A | | 6/1988 | Seaver |
| 4,789,992 A | * | 12/1988 | Wickersheim et al. ...... 374/161 |

(Continued)

FOREIGN PATENT DOCUMENTS

JP     57-79417     5/1982

(Continued)

OTHER PUBLICATIONS

C.D. Thurmond: "The standad thermodynamic functions for the formation of electrons and holes In Ge, Si, GaAs, and GaP" J. Electrochem. Soc., vol. 122, p. 1133, 1975.

*Primary Examiner*—Diego Gutierrez
*Assistant Examiner*—Mirellys Jagan
(74) *Attorney, Agent, or Firm*—Oblon, Spivak, McClelland, Maier & Neustadt, P.C.

(57) ABSTRACT

An apparatus (295) using specular reflection spectroscopy to measure a temperature of a substrate (135). By reflecting light (100) from a substrate, the temperature of the substrate can be determined using the band-edge characteristics of the substrate. This in situ apparatus can be used as a feedback control in combination with a variable temperature substrate holder to more accurately control the processing conditions of the substrate. By utilizing a multiplicity of measurement sites, the variation of the temperature across the substrate can also be measured.

46 Claims, 10 Drawing Sheets

U.S. PATENT DOCUMENTS

| | | | | |
|---|---|---|---|---|
| 4,989,970 | A | 2/1991 | Campbell et al. | |
| 5,118,200 | A | 6/1992 | Kirillov et al. | |
| 5,255,286 | A | 10/1993 | Moslehi et al. | |
| 5,265,957 | A * | 11/1993 | Moslehi et al. | 374/1 |
| 5,322,361 | A | 6/1994 | Cabib et al. | |
| 5,388,909 | A | 2/1995 | Johnson et al. | |
| 5,474,381 | A | 12/1995 | Moslehi | |
| 5,568,978 | A | 10/1996 | Johnson et al. | |
| 5,636,258 | A * | 6/1997 | Okumura et al. | 378/73 |
| 5,645,351 | A | 7/1997 | Nakata et al. | |
| 5,715,361 | A * | 2/1998 | Moslehi | 392/416 |
| 5,772,323 | A * | 6/1998 | Felice | 374/127 |
| 5,823,681 | A * | 10/1998 | Cabib et al. | 374/131 |
| 5,841,110 | A * | 11/1998 | Nenyei et al. | 374/161 |
| 5,874,711 | A * | 2/1999 | Champetier et al. | 219/497 |
| 5,876,121 | A | 3/1999 | Burns et al. | |
| 5,938,335 | A * | 8/1999 | Yam | 374/124 |
| 5,997,175 | A * | 12/1999 | Champetier et al. | 374/126 |
| 6,062,729 | A | 5/2000 | Ni et al. | |
| 6,090,210 | A * | 7/2000 | Ballance et al. | 118/725 |
| 6,129,807 | A * | 10/2000 | Grimbergen et al. | 156/345.24 |
| 6,151,446 | A * | 11/2000 | Hunter et al. | 392/416 |
| 6,174,081 | B1 | 1/2001 | Holm | |
| 6,293,696 | B1 * | 9/2001 | Guardado | 374/2 |
| 6,393,210 | B1 * | 5/2002 | Wu | 392/416 |
| 6,479,801 | B1 * | 11/2002 | Shigeoka et al. | 374/121 |
| 6,481,886 | B1 * | 11/2002 | Narendrnath et al. | 374/141 |
| 6,563,092 | B1 * | 5/2003 | Shrinivasan et al. | 219/502 |
| 6,799,137 | B2 * | 9/2004 | Schietinger et al. | 702/134 |
| 6,830,942 | B1 * | 12/2004 | Alers et al. | 374/121 |
| 6,839,507 | B2 * | 1/2005 | Adams et al. | 374/161 |
| 2001/0006530 | A1 * | 7/2001 | Adams et al. | 374/131 |
| 2001/0014111 | A1 * | 8/2001 | Shimizu | 374/141 |
| 2001/0047879 | A1 | 12/2001 | Jiwari et al. | |
| 2002/0004309 | A1 | 1/2002 | Collins et al. | |
| 2002/0125223 | A1 * | 9/2002 | Johnson et al. | 219/121.43 |
| 2002/0189757 | A1 * | 12/2002 | Denton et al. | 156/345.27 |

FOREIGN PATENT DOCUMENTS

JP     57-197433     12/1982

* cited by examiner

APPARATUS FOR MEASURING TEMPERATURES OF A WAFER USING SPECULAR REFLECTION SPECTROSCOPY

CROSS-REFERENCE TO RELATED APPLICATIONS

The present application claims priority to and is related to International Application Ser. No. PCT/US01/27767, filed on Oct. 12, 2001, which claims priority to U.S. Provisional Application Ser. No. 60/239,922, filed on Oct. 13, 2000. The present application is related to U.S. application Ser. No. 10/168,544, filed on Jul. 2, 2003 and U.S. application Ser. No. 10/088,504, filed on Mar. 28, 2002. Each of those applications is incorporated herein by reference in its entirety.

BACKGROUND OF THE INVENTION

1. Field of the Invention

The present invention is directed to an in-situ method of measuring the temperature of a substrate with a temperature dependent band-gap using band-edge thermometry (BET), and, more specifically, using specular reflection spectroscopy (SRS).

2. Discussion of the Background

The accurate measurement of semiconductor substrate temperatures during processing is highly desirable for semiconductor substrate processing. In particular, most processes are temperature sensitive, and therefore, accurate temperature measurement is a pre-requisite to the control of optimal conditions for etch and/or deposition chemistry. Moreover, a spatial variation of temperature across a semiconductor substrate can lead to non-uniform processing when either etching or depositing material.

There are three geometric modes or configurations of band-edge thermometry (BET) as illustrated in FIGS. 1A–1D: (1) diffuse reflectance spectroscopy (DRS; see FIGS. 1A and 1B), (2) transmission spectroscopy (TS; see FIG. 1C), and (3) specular reflection spectroscopy (SRS; see FIG. 1D).

In the DRS mode, the light source and detector are on the same side of the substrate with the detector placed in a non-specular position (see Johnson et al., U.S. Pat. Nos. 5,568,978 and 5,388,909 (hereinafter "the '978 and '909 patents" respectively)). A non-specular detector only sees the light that is transmitted through the wafer and that is diffusely back scattered into the solid angle of the detector. In the DRS method, the double-pass transmission of light through the substrate is measured as a function of wavelength or, equivalently, photon energy. As the wavelength increases, the photon energy decreases, and the onset of substrate transparency (or, equivalently, the band-gap energy) occurs as the photon energy becomes less than the band-gap energy.

In the TS mode, the onset of substrate transparency is determined by the transmission of light through the substrate as described in U.S. Pat. No. 5,118,200 (hereinafter "the '200 patent"). In this geometry, the light source and the detection system are on opposite sides of the wafer. One difficulty with this approach is that it requires optical access to the chamber at opposite sides of the substrate. However, in comparison to the SRS mode, the TS mode results in an increase in the light intensity received by the optical detector.

In the SRS mode, the light source and detector are also on the same side of the substrate. The detector is placed in a specular position where it detects light that is specularly reflected from both surfaces of the wafer (see U.S. Pat. No. 5,322,361 (hereinafter "the '361 patent)). The light that is reflected into the detector without traveling through the wafer contains no temperature information and consequently adds only a relatively constant background signal. The light component that is reflected from the opposite internal surface of the substrate travels back through the wafer and onto the detector. That reflected component, which passes twice though the wafer, contains the useful temperature information.

No matter what mode is used, a temperature signature must be extracted from the spectra. In general, three algorithms have commonly been used to extract substrate temperature from band-edge spectra: (1) the spectral position of the maximum of the first derivative or, equivalently, the inflection point, (2) a direct comparison of the spectrum to a predetermined spectral database, and (3) the position of the spectrum knee (i.e., the location of the maximum of the second derivative). The first method has been discussed in the '200 patent. That method determined the substrate temperature as a function of the position of the inflection point of the spectrum in a previous calibration run where the temperature of each spectrum is known. The advantages of that method are that it is simple, fast and independent of the absolute intensity of measurement. The disadvantage is that it is very sensitive to interference effects that may occur at either surface of the processed silicon (Si) wafer.

In the second approach, the '361 patent compares a given spectrum to a temperature-dependent database composed of spectra taken at known temperatures. One advantage is that it is reported to work well for Si wafers. A disadvantage is that it is sensitive to interference effects and requires an absolute reflectivity measurement. Accordingly, each wafer may require a separate normalization spectrum.

Lastly, the '978 and '909 patents disclose a DRS mode BET, using the position of the spectrum knee as a signature. Its advantage is that it is the closest distinct point to the onset of transparency of a substrate, and is therefore less sensitive to interference effects. A shortcoming of this approach is that it requires sophisticated fitting algorithms that may be too slow for some current applications.

In general, a BET system includes three main units, i.e., a light source, a dispersion device and a photo-detector. Currently, there are several commercially available systems; however, none of these systems is fully capable of satisfying the following criteria:

1) Non-contact thermometry from the bare backside of Si wafers during front side processing.
2) Use of optical methods and quartz rods to couple light in and out of the process chamber.
3) Two-dimensional snapshot of wafer temperature.
4) Simultaneous samples of several points (approximately 10) on large Si wafers with a response time of 100 msec or less.
5) Temperature range of 20 to 300° C.
6) Accuracy of temperature measurement to within 2 to 5° C.

SUMMARY OF THE INVENTION

It is an object of the present invention to provide a non-intrusive method of measuring (1) substrate temperature and (2) spatial variation of the substrate temperature. This measuring process can, in turn, be employed to (1) tune the thermal response of a chamber to a process and (2) concurrently modify temperature characteristics of the chamber in response to temperature measurements performed in-situ throughout that process.

Since the band-gap of most semiconductor materials decreases with temperature (linearly above the Debye temperature), the onset of transparency of semiconductor materials gives a precise reproducible measure of substrate temperature. This makes band-edge thermometry (BET) an ideal method for in-situ non-contact measurements of substrate temperature during semiconductor processing. This method is particularly useful for low temperature applications where pyrometry is not effective and in applications where the process has a detrimental effect on in-situ temperature sensors (e.g., thermocouples) or, conversely, where in-situ temperature sensors have a detrimental effect on the process.

BRIEF DESCRIPTION OF THE DRAWINGS

A more complete appreciation of the invention and many of the attendant advantages thereof will become readily apparent to those skilled in the art with reference to the following detailed description, particularly when considered in conjunction with the accompanying drawings, in which.

DETAILED DESCRIPTION OF THE PREFERRED EMBODIMENTS

Figure 1A:
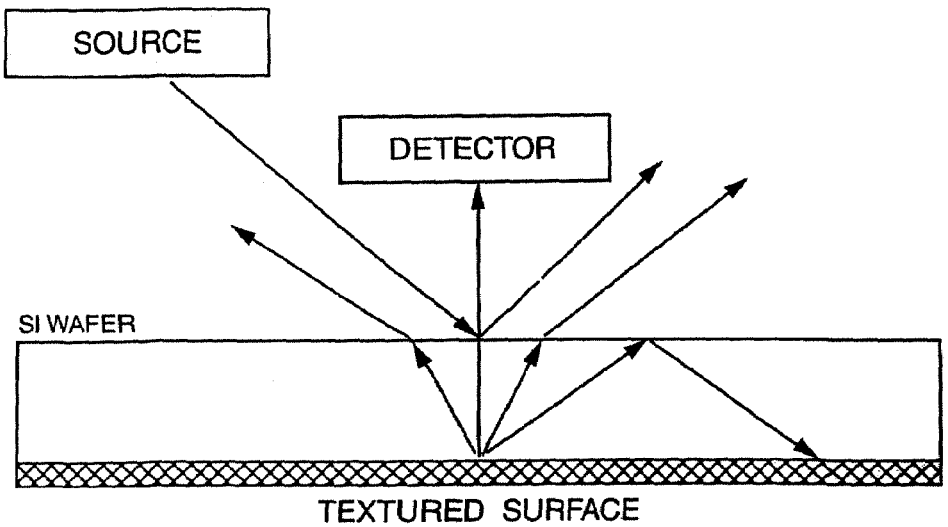
FIG. 1A is a schematic illustration of a first configuration of an apparatus using diffuse reflectance spectroscopy.
Figure 1B:
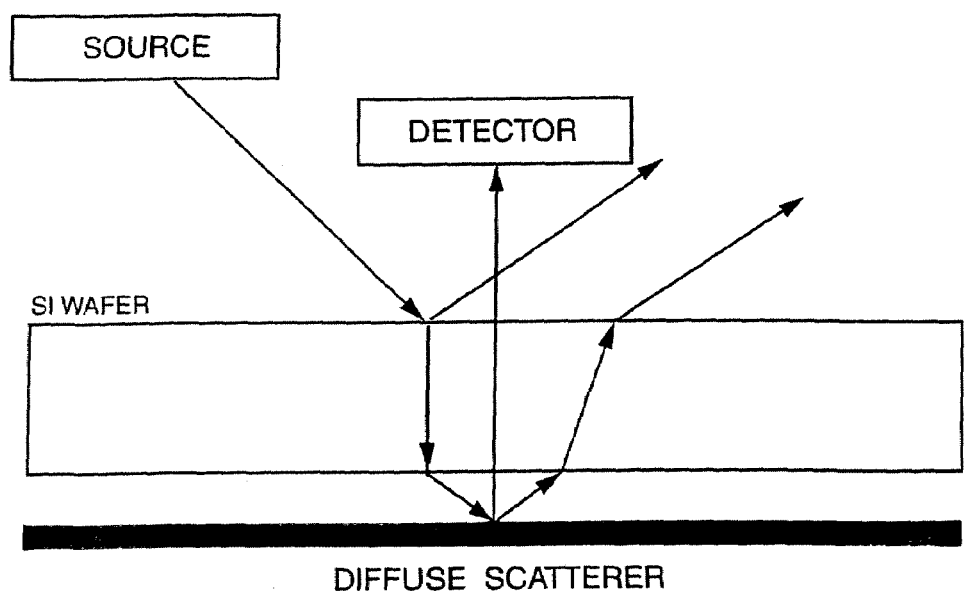
FIG. 1B is a schematic illustration of a second configuration of an apparatus using diffuse reflectance spectroscopy.
Figure 1C:
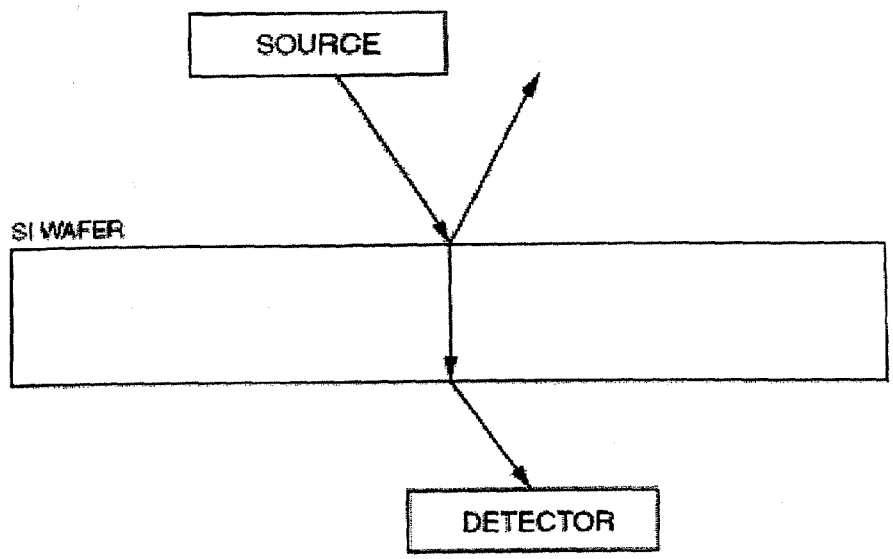
FIG. 1C is a schematic illustration of a first configuration of an apparatus using transmission spectroscopy.
Figure 1D:
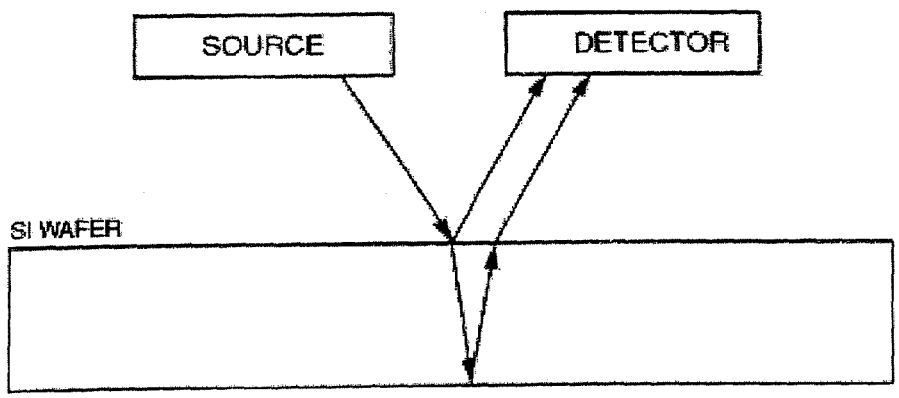
FIG. 1D is a schematic illustration of a first configuration of an apparatus using specular reflection spectroscopy.
Figure 2:
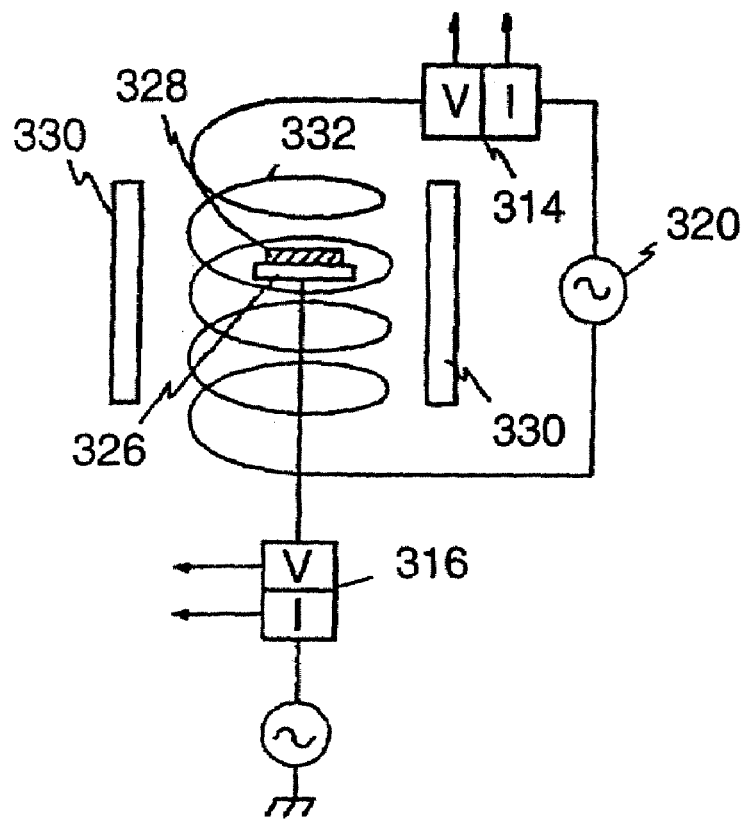
FIG. 2 is an illustration of a prior art inductively coupled plasma (hereinafter ICP) source.
Figure 3:
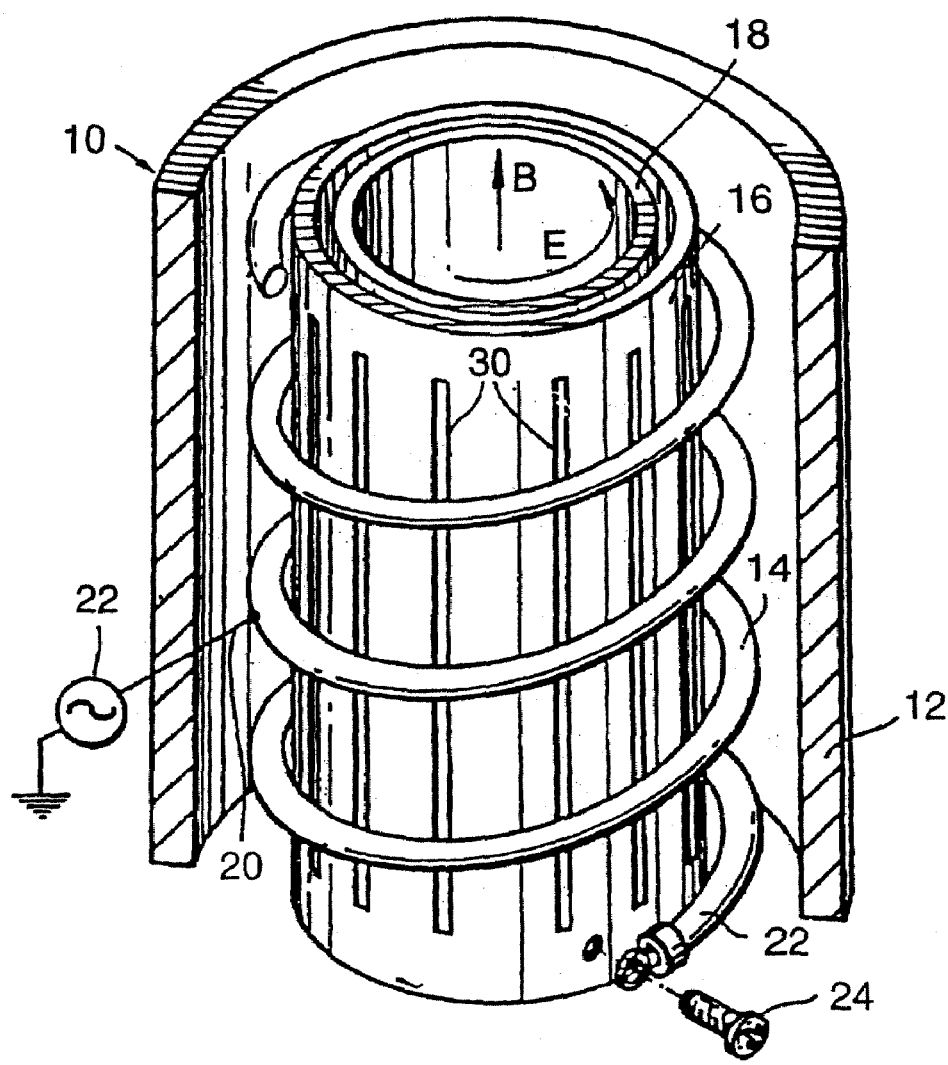
FIG. 3 is an illustration of a prior art electrostatically shielded radio frequency (hereinafter ESRF) plasma source.

Referring now to the drawings, wherein like reference numerals designate identical or corresponding parts throughout the several views, FIG. 1D is a schematic illustration of a first configuration using specular reflection spectroscopy. The following sections describe: (1) the fundamental principles behind the use of specular reflection spectroscopy (SRS); (2) embodiments used for measuring temperature, including a description of the light source(s), a description of the optics, and a description of the detection system; (3) a method for extracting temperature information; (4) the measurement speed; (5) the spectral resolution of the measurement, and (6) the tuning of the thermal characteristics of a substrate.

Fundamental Principles

The basic theory described herein is based on simulations of the Si band-edge when the absorption cross-section is assumed to be constant over the operating temperature and spectral ranges. Furthermore, the absorption coefficient near the band-edge is assumed to be proportional to the joint density of states of an indirect band-gap material with parabolic bands. Finally, the simulated band-edge reflectance spectra for Si are based on the SRS measurement configuration.

Assuming that absorption is proportional to the optical joint density of states and that the energy bands are parabolic, the absorption coefficient is quadratic in energy (for energies above the band-gap (in indirect band-gap materials)). Under those assumptions, the absorption edge for Si is described by:

$$\alpha_g = 0, \text{ for } h\nu < E_g,$$

and $$\alpha_g = A_g(h\nu - E_g)^2, \text{ for } h\nu \geq E_g,$$

where $$E_g = E_g(T) = E_g(0) - (aT^2)/(T+B)$$

is the band-gap energy of Si as a function of temperature (see Thurmond, 1975), T is temperature, hv is the photon energy, and $A_g$ is a constant. Semiconductors are typically never perfectly transparent below the band edge due to absorption caused by free carriers. This absorption is represented by the term:

$$\alpha_f = A_f T^2,$$

where $A_f$ is a constant. The total absorption is given by:

$$\alpha = \alpha_g + \alpha_f.$$

Finally, for the SRS measurement configuration, the band-edge spectra are given by:

$$R_T = R + (R(1-R^2)e^{-\alpha d})/(1 - R^2 e^{-2\alpha d}),$$

where R is the reflectivity at either wafer surface and d is the wafer thickness.

Figure 8:
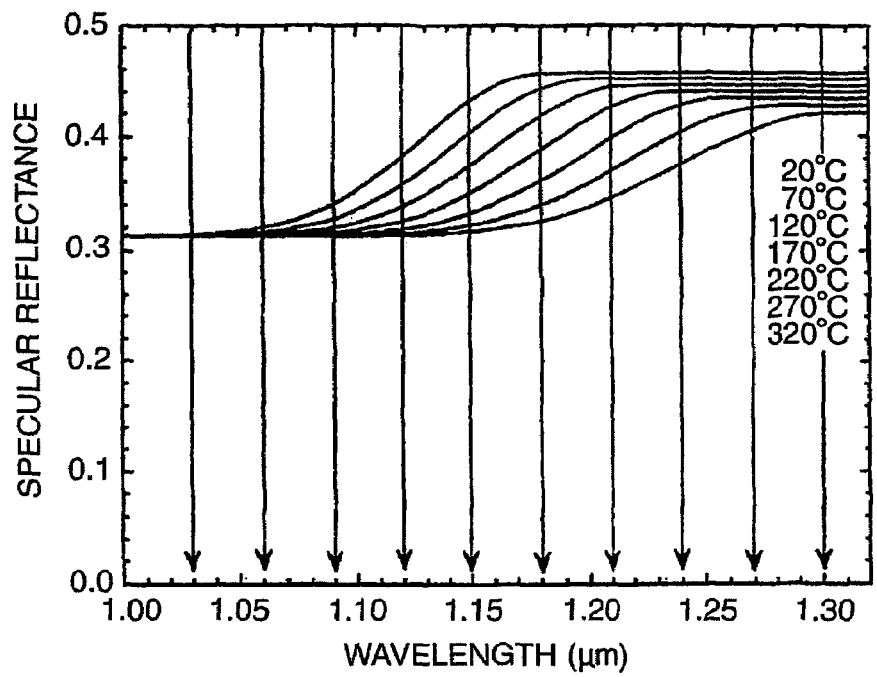
FIG. 8 is a graph showing the normalized specular reflectance of IR radiation from a Si substrate as a function of wavelength with temperature as a parameter.

Band-edge spectra simulations using the above equation for the reflectance that includes the reflections at both surfaces of the substrate (i.e., the values of $R_T$), are shown in FIG. 8 for a 40 mil thick silicon wafer. For the purpose of these simulations, the band-gap parameters used are $E_g(0)=$ 1.12 eV, a=0.000473 eV/K, and B=636 K (see Thurmond, 1975) and the other parameters used are $A_g=1000$ cm$^{-1}$eV$^{-2}$, $A_f=0.000004$ cm$^{-1}$K$^{-2}$, and R=0.313. These parameters may vary depending on the type of doping and the doping level of the substrate. In addition, the value of the total reflectance $R_T$ depends upon the wafer thickness. Therefore, accuracy may be improved by providing a separate calibration curve for each doping type and level and for each wafer thickness. However, given a batch of wafers with uniform thickness and doping levels, this measurement technique will have a 1° C. reproducibility between wafers. The simulated spectra shown in FIG. 8 cover the temperature range from 20° C. to 320° C. The temperature of each spectrum is listed at the right-hand side of the plot, with the lowest temperature corresponding to the left-most spectrum. The temperature increases 50° C. per spectrum moving to the right where the right-most spectrum corresponds to 320° C. Those simulated spectra depict, as a function of wavelength and temperature, the fraction of incident radiation that is reflected from the substrate. Some of the incident light is reflected without having first passed through the substrate; some passes through the substrate, is reflected from the second substrate surface, and then emerges from the substrate at the first substrate surface. Multiple transmissions and reflections must be considered. The useful temperature information is contained in the reflectance curves for reflectances in a corresponding range (e.g., between approximately 0.3 and 0.5). In this range the incident light is both absorbed within the substrate and partially reflected from the substrate surfaces. The absorption is a function of the photon energy or, equivalently, the wavelength of the incident light. For photon energies greater than the band gap energy, the light is absorbed within the substrate to such an extent that any light reflected from the second substrate surface does not emerge from the substrate at the first substrate surface. This condition corresponds to the horizontal portions of the spectra shown in FIG. 8 for which the reflectance is about 0.3. For photon energies less than the band gap energy, the incident light is not absorbed; the substrate is transparent, and the reflectance is essentially independent of the wavelength. This condition corresponds to the horizontal portions of the spectra shown in FIG. 8 for which the reflectance is between about 0.4 and 0.5.

The reflected light is analyzed by the wavelength sensitive detection system, and from a determination of the wavelength at which the onset of transparency occurs, the substrate temperature may be inferred.

The accuracy of the determination of substrate temperature can be improved through the use of additional information. Such additional information includes, but is not limited to: (1) the extent of process chamber use since its most recent cleaning, (2) condition of the wafer surface, (3) wafer type (i.e., p-type or n-type and impurity concentration), (4) the characteristics of any surface coatings on the wafer, and (5) the size of the measurement elements in comparison to the wafer size and the sizes of any features on the wafer.

Figure 4:
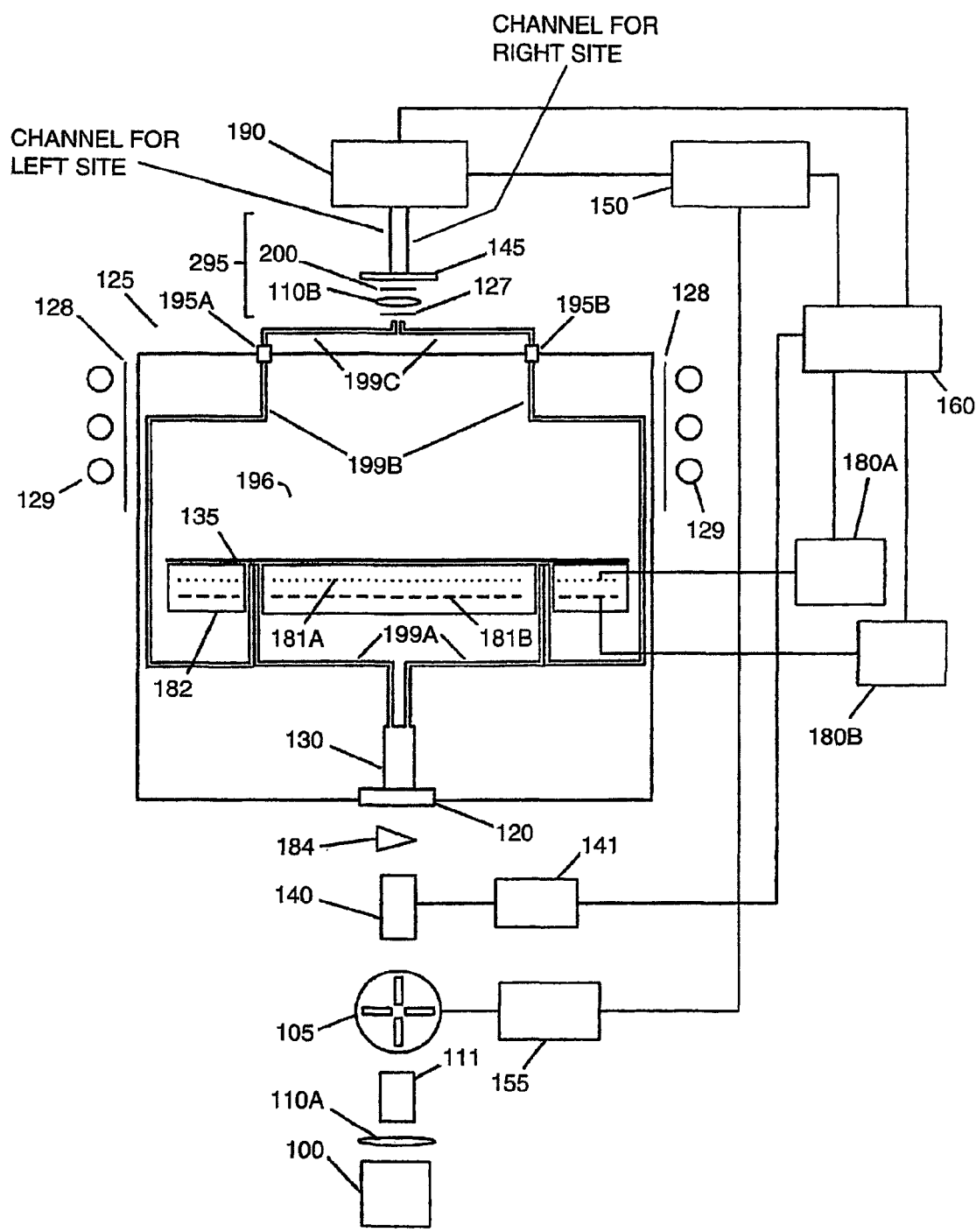
FIG. 4 is a schematic illustration of a first embodiment of a wafer temperature measurement system that uses feedback to control the temperature of a substrate.

A first embodiment of the present invention is shown in FIG. 4. It comprises a radiation source with an emission spectrum that includes at least the range of wavelengths of interest as shown in FIG. 8, and a wavelength sensitive detection system utilizing a spectrometer comprising an acousto-optic tunable filter (hereinafter AOTF), and, as shown in FIG. 4, a two-dimensional (hereinafter 2-D) photodetector array (e.g., a 2-D charge-coupled-device (CCD) array or a 2-D charge-injection-device (CID) array). As would be appreciated by one of ordinary skill in the art, the band-gap energy can be determined as a function of temperature from FIG. 8.

A CID array has two distinct advantages relative to a CCD array for the purposes described herein. Firstly, a CID array is not subject to "blooming," which may occur when a pixel is saturated and light intensity "spills" over into adjacent pixels. Secondly, pre-selected pixels within the pixel array may be sampled without scanning the entire pixel array. However, CCD arrays are typically faster and more sensitive than their CID counterparts. CID arrays may have a maximum pixel interrogation frequency of about 100 kHz (with zero gain). As the interrogation frequency decreases, the gain increases. For example, a gain of about 50 is attainable for an interrogation frequency of about 33 kHz. However, CCD arrays may be used at frequencies as high as about 100 kHz.

One advantage of the present invention is due to the use of an AOTF to replace mechanically rotated grating/single detector methods. In doing so, superior speed can be achieved over traditional methods while obtaining a 2-D representation of the temperature distribution across a substrate.

Furthermore, high speed extraction of temperature information from band-gap spectra is attainable using a method that utilizes digital filters based upon a higher-order derivative of the spectrum. The method presented herein can reduce the time necessary for temperature extraction and minimize interference effects that are inherent to prior temperature extraction methods.

A first embodiment of the system of the present invention is illustrated in FIG. 4. For clarity, only two measurement sites are shown in FIG. 4, but a plurality of measurement sites (e.g., 10) is possible. An optical system 295 views the light reflected from a plurality of sites on a substrate being processed. In the illustrated embodiment, the light reflected from the plurality of measurement sites is transmitted by means of optical fibers 199B through fiber optic vacuum feedthroughs 195A and 195B located in an upper surface of the process chamber in an ICP or ESRF plasma processor. Other locations are possible and may indeed be preferable. In particular, it would be advantageous for the optical fibers to enter and leave the vacuum chamber below the plane of the wafer to lessen the likelihood of particulate contamination of the wafer. The ICP and ESRF plasma processors include at least one induction coil 129, which establishes the plasma 196, Moreover, an ESRF processor includes an electrostatic shield 128 as well. Ideally the axis of the optical system coincides with the axis of either the substrate or the wafer chuck.

Figure 9:
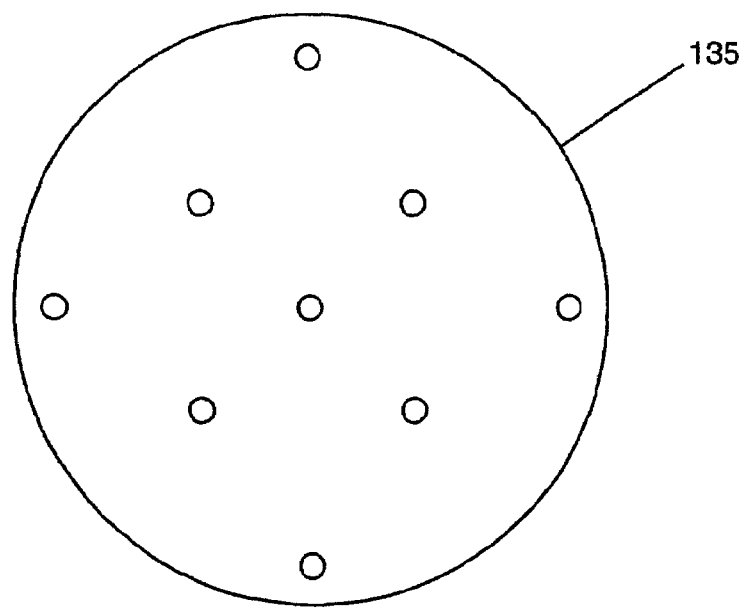
FIG. 9 is a schematic illustration of a wafer including plural measurement sites.

The optical system 295 of FIG. 4 includes: (a) a band-pass filter 127 that passes (preferably with minimal attenuation) signals at all wavelengths within a selected range (e.g., between 1.00 and 1.35 μm) and, preferably, significantly attenuates signals at all wavelengths outside that range; and (b) a neutral density filter or a mechanical iris 200, either of which may be electrically controlled, that permits uniform adjustment of the intensity of those signals at wavelengths within the range transmitted by the band-pass filter 127; and (c) a lens system 110B (e.g, including multiple elements) having a field of view encompassing all of the optical fibers 199C, transmitting reflected light from the plurality of measurement sites; and (d) a 2-D detection array 145 (e.g., a CCD array or a CID array) on which the IR-transmitting lens system 110B forms an image of the wafer 135, by means of the IR radiation reflected from the wafer 135 at the multiplicity of measurement sites (e.g., as illustrated in FIG. 9).

The band-pass filter 127 improves the signal-to-noise ratio (hereinafter "S/N ratio") of the measurement system by reducing to acceptable levels the effect of radiation at wavelengths outside a region of interest (e.g., outside of a region between 1.00 and 1.35 μm) on the detection array 145. The neutral density filter or mechanical iris 200 provides the ability to reduce the intensity of the IR radiation with wavelengths within the region of interest, that impinges on the 2-D detection array 145 to prevent saturation of elements of the 2-D detection array 145. In this way, erroneous data due to the saturation of individual elements of the 2-D detection array 145 is ameliorated.

The measurement system according to the present invention uses the SRS mode arrangement generally shown in FIG. 1D. A schematic representation of one embodiment of the present invention is shown in FIG. 4. It includes a broad spectrum light source 100, an acousto-optical tunable filter (hereinafter AOTF) 140, the wavelength sensitive optical system 295 described above, and a lock-in amplifier 150.

A broad spectrum light source 100 (e.g., a tungsten-halogen light source or an array of IR light emitting diodes (hereinafter "LEDs")) emits IR radiation that is focused by lens 110A (either a single-or multi-element lens) onto the entrance aperture of collimator 111. The radiation passing through collimator 111 is periodically chopped (i.e., interrupted) by the mechanical chopper 105 driven by the motor 155. The radiation that passes through the mechanical chopper 105 impinges on the input aperture of the AOTF 140, which is driven by the radio frequency (hereinafter "RF") driver 141. The frequency of the signal from the RF driver 141 determines the narrow band of frequencies that will pass through the AOTF 140. An exemplary AOTF 140 selects signals having wavelengths within the range from about 1.00 μm to about 1.35 μm with a response time of approximately 5 μsec, but other ranges and response times are possible. The angle at which the radiation with the selected wavelength leaves the AOTF 140 depends, in general, on the wavelength. However, it is advantageous for all IR radiation that leaves the AOTF 140 to travel in the same direction when it enters reaction chamber 125 through IR-transmitting vacuum window 120. To achieve this end, the prism 184 is included in the optical path between the AOTF 140 and the IR-transmitting vacuum window 120.

In one embodiment, the IR radiation passes through IR-transmitting vacuum window 120 and impinges upon optical beam splitter 130, which divides the IR radiation into plural parts (either equal or dissimilar), the number of parts being determined by the number of measurement sites on the wafer 135 at which the temperature is to be determined. In an alternate embodiment, in which only one measurement site is used, the optical beam splitter 130 is omitted. FIG. 4 shows a division into only two equal parts for simplicity, but a division into many (e.g., $\geq 10$) equal parts is possible. The IR-transmitting vacuum window 120 maintains the vacuum integrity of the reaction chamber 125. Some of the IR radiation passes through optical fibers 199A through the wafer chuck 182 to the underside of the wafer 135, is reflected from the wafer 135 and transmitted through optical fibers 199B and fiber optic feedthroughs 195A and 195B and optical fibers 199C to the wavelength sensitive optical system 295. The optical vacuum feedthroughs 195A and 195B are shown in the upper surface of the process chamber, but other locations are possible and may, indeed, be preferable. In particular, it would be advantageous for the optical fibers to enter and leave the vacuum chamber below the plane of the wafer to lessen the likelihood of particulate contamination of the wafer.

Figure 5:
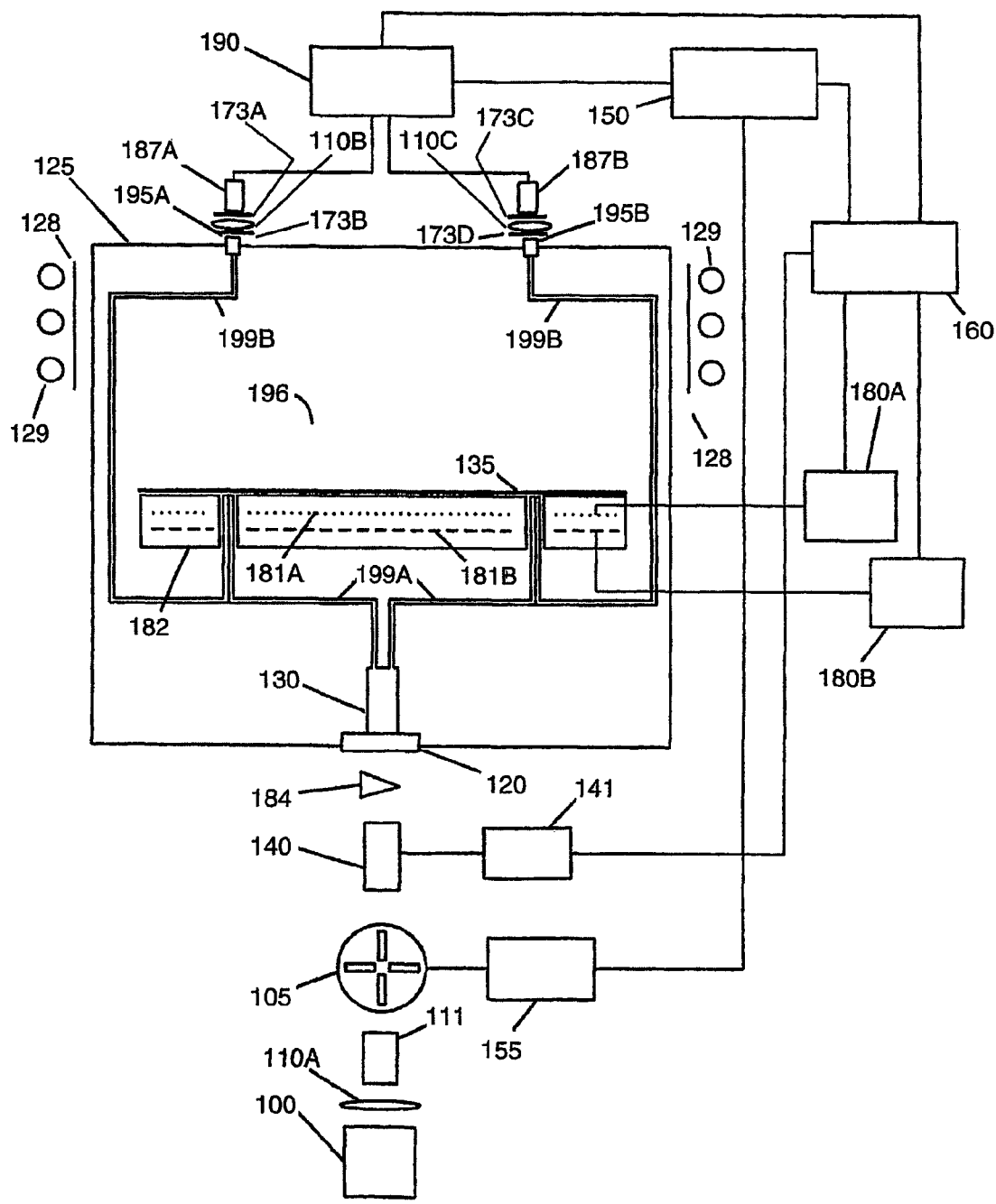
FIG. 5 is a schematic illustration of a second embodiment of a wafer temperature measurement system that uses feedback to control the temperature of a substrate.

In FIG. 5, a second embodiment in which the plasma 196 is established within an ICP or an ESRF plasma processor, the IR radiation passes through vacuum window 120 and impinges upon optical beam splitter 130, which divides the IR radiation into at least two parts (e.g., 10 parts, where the number of parts is determined by the number of sites on wafer 135 at which the temperature is to be determined). Vacuum window 120 maintains the vacuum integrity of reaction chamber 125. Optical fibers 199A conduct IR radiation through wafer chuck 182 to the under side of each of the at least two sites on wafer 135 at which the temperature is to be determined. Some of the IR radiation reflected from the underside of the wafer 135 is collected by optical fibers 199B and is conducted by them to optical vacuum feedthroughs 195A and 195B, optical filters 173B and 173D, lenses 110B and 110C, and filters 173A and 173C, which focus the IR radiation onto photodiodes 187A and 187B, respectively. In an alternative embodiment, filters 173A and 173C are omitted. In yet another alternate embodiment, filters 173A and 173C are used but filters 173B and 173D are omitted. In a further alternate embodiment, filters 173A, 173B, 173C and 173D are omitted. The amount of radiation coupled to the photodiodes 187A and 187B, thus is controlled to prevent saturation of the detector (or array as described below). The filters pass all wavelengths in a desired range (e.g., between 1.00 μm and 1.35 μm) and as nearly as possible significantly attenuate all wavelengths outside the desired range. In an embodiment in which those filters do not prevent saturation of the detectors, a suitable neutral density filter (e.g., an electrically controlled neutral density filter) is included with each band-pass filter. Filters of the types described herein are well known to persons of ordinary skill in the art. In a further alternate embodiment, neutral density filters can be replaced by a mechanical iris for limiting the amount of light passing therethrough.

Optical vacuum feedthroughs 195A and 195B maintain the vacuum integrity of reaction chamber 125. The optical vacuum feedthroughs 195A and 195B are shown in the upper surface of the process chamber, but other locations are possible and may, indeed, be preferable. In particular, it would be advantageous for the optical fibers to enter and leave the vacuum chamber below the plane of the wafer to lessen the likelihood of particulate contamination of the wafer. In an embodiment in which focusing lenses are included in the packaged photodiodes, separate lenses 110B and 110C are omitted. The output of each of photodiodes 187A and 187B is selected sequentially by interrogator 190 according to a protocol provided by computer 160 and is conveyed to lock-in amplifier 150. If a lock-in amplifier with a sufficient number of input channels is used, interrogator 190 is not necessary. The output signal from lock-in amplifier 150 is sent to computer 160, which stores the data for each of photodiodes 187A and 187B. After output data for photodiodes 187A and 187B have been stored in computer 160, computer 160 sends a signal to RF driver 141 for acousto-optical filter 140 and the RF drive frequency applied to acousto-optical filter by RF driver 141 is changed to another frequency (e.g., the second of ten pre-selected frequencies). When computer 160 has received data for diodes 187A and 187B corresponding to all pre-selected frequencies, it uses a program stored in its memory to calculate the temperature at the wafer site corresponding to photodiode 187A and at the wafer site corresponding to photodiode 187B. Such temperature measurements can be recorded in volatile or non-volatile storage.

Figure 6:
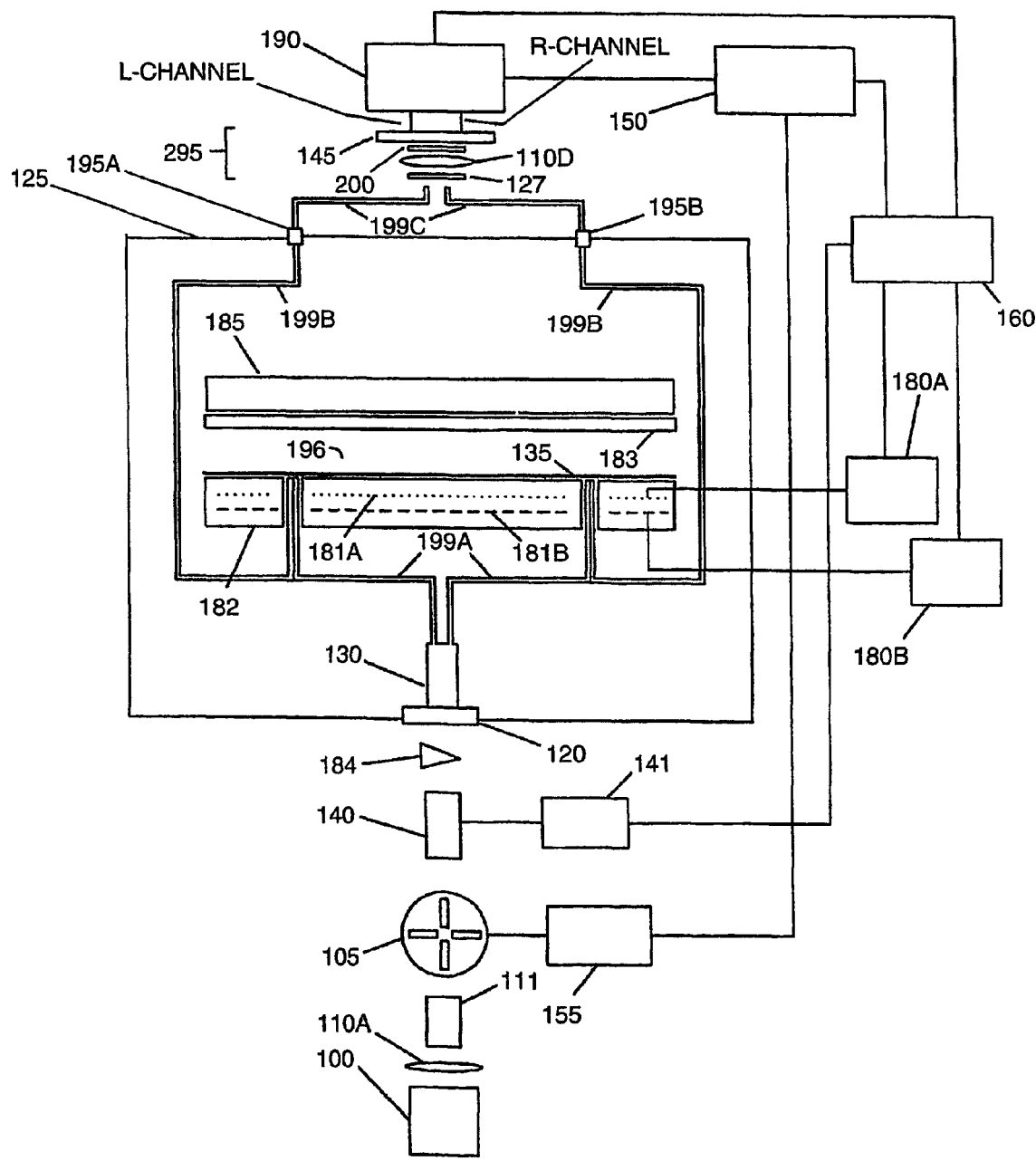
FIG. 6 is a schematic illustration of a third embodiment of a wafer temperature measurement system that uses feedback to control the temperature of a substrate.

A third embodiment of the feedback system of the present invention, suitable for use with a capacitively-coupled plasma processor, is shown in FIG. 6. In this embodiment, the plasma 196 is excited by means of the RF drive electrode 185 which may have mounted on its surface proximate to the plasma the silicon facing 183. In at least one embodiment of the present invention, the upper and/or lower electrode may be movable. One such embodiment uses a vertically translatable chuck or lower electrode. The IR radiation passes through vacuum window 120 and impinges upon optical beam splitter 130, which divides the IR radiation into at least two parts (e.g., 10 parts, where the number of parts is determined by the number of sites on wafer 135 at which the temperature is to be determined). As in the embodiment of FIG. 4, optical fibers 199A conduct IR radiation through wafer chuck 182 to the under side of each of the at least two sites on wafer 135 at which the temperature is to be determined. As in the embodiment of FIG. 4, optical fibers 199B conduct the IR radiation reflected from the substrate 135 to the optical vacuum feedthroughs 195A and 195B, to lens 110D, and through filters 127 and 200 which focus the radiation on charge-coupled-device (CCD) array or charge-injection-device (CID) array 145 which may be either a linear array or a two-dimensional array. The optical vacuum feedthroughs 195A and 195B are shown in the upper surface of the process chamber, but other locations are possible and may, indeed, be preferable. In particular, it would be advantageous for the optical fibers to enter and leave the vacuum chamber below the plane of the wafer to lessen the likelihood of particulate contamination of the wafer. The output of each element of CCD or CID array 145 is selected sequentially by interrogator 190 according to a protocol provided by computer 160 and is conveyed to lock-in amplifier 150. The filters 127 and 200 should pass all wavelengths between 1.00 μm and 1.35 μm and as nearly as possible completely attenuate all wavelengths outside this range. If the filter does not prevent saturation of the CCD or CID array, it may be necessary to include with the band-pass filter a suitable neutral density filter. An electrically controlled neutral density filter may be used. Filters of the types described herein are known to persons of ordinary skill in the art.

Figure 7:
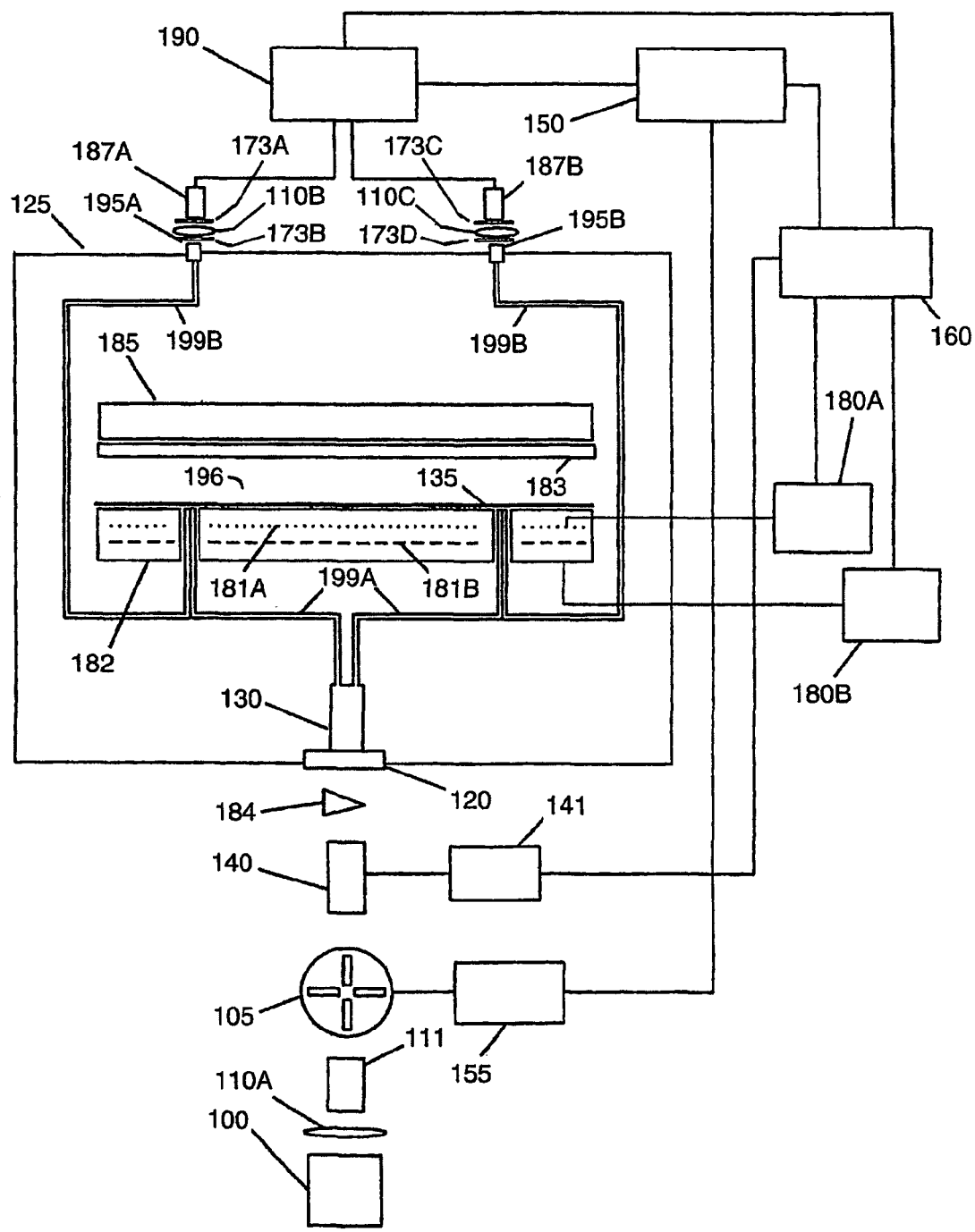
FIG. 7 is a schematic illustration of a fourth embodiment of a wafer temperature measurement system that uses feedback to control the temperature of a substrate.

In FIG. 7, a fourth embodiment which is suitable for a capacitively-coupled plasma processor is shown. Except as noted here, the fourth embodiment is the same as the third embodiment. The plasma 196 is excited by means of the RF drive electrode 185 which may have mounted on its surface proximate to the plasma the silicon facing 183. The IR radiation passes through vacuum window 120 and impinges upon optical beam splitter 130, which divides the IR radiation into at least two parts (e.g., 10 parts, where the number of parts is determined by the number of sites on wafer 135 at which the temperature is to be determined). Vacuum window 120 maintains the vacuum integrity of reaction chamber 125. As in the embodiment of FIG. 5, optical fibers 199A conduct IR radiation through wafer chuck 182 to the under side of each of the at least two sites on wafer 135 at which the temperature is to be determined. Some of the IR radiation reflected from the underside of the wafer 135 is collected by optical fibers 199B and is conducted by them to optical vacuum feedthroughs 195A and 195B, optical filters 173B and 173D, lenses 110B and 110C, and filters 173A and 173C, which focus the IR radiation onto photodiodes 187A and 187B, respectively. Filters may be selectively omitted as discussed with reference to FIG. 5, to prevent saturation of the detector or array. Similarly, optical vacuum feedthroughs can be used as discussed with reference to FIG. 5. In a further alternate embodiment, neutral density filters can be replaced by a mechanical iris for limiting the amount of light passing therethrough.

It will be apparent to a person of normal skill in the art that the invention described herein is also suitable for use with a plasma processor that employs both inductive and capacitive coupling means to excite the plasma. For example, an inductance coil 129 and an electrostatic shield may be incorporated into the embodiments of FIGS. 6 and 7. Moreover, the invention described herein is also suitable for use with other plasma generation means such as Helicon wave, electron cyclotron resonance (ECR), etc.

All of the embodiments described herein may also be realized using an AOTF having integral fiber optic input and output pigtails. When an AOTF of this type is used, some modifications of the optical elements proximate to the AOTF 140 shown in FIGS. 4, 5, 6, or 7 are required. For example, in the embodiment shown in FIG. 5, fiber collimators/focusers like the SMA 905 or SMA 906 manufactured by OZ Optics, Ltd. might be used advantageously with a pigtailed AOTF in conjunction with or in place of collimator 111 and prism 184. Such modifications would be understood by a person of ordinary skill in the art and are, of course, consistent with the spirit of this invention.

The measurement procedure begins when the equipment operator enters a start command by means of the input terminal (e.g., keyboard 422 or mouse 424) of the computer 160. RF driver 141 then sends to AOTF 140 a signal that selects the first narrow band of IR wavelengths for passage through the wafer 135. The output of each element of the 2-D detection array 145 is selected sequentially or in parallel by the interrogator 190 according to a protocol provided by the computer 160 and is conveyed to the lock-in amplifier 150 and thereafter to the computer 160, which stores the data for each element of the 2-D detector array 145. (If a lock-in amplifier with a sufficient number of input channels is used, the interrogator 190 is not necessary.) After output data for each element of the 2-D detection array 145 have been stored in the computer 160, the computer 160 sends a signal to the RF driver 141 for the AOTF 140 and the RF drive frequency applied to the AOTF 140 by the RF driver 141 is changed to another of, perhaps, ten pre-selected values. The computer 160, having received data for all elements of the 2-D detector array 145 corresponding to all of the pre-selected frequencies, calculates the temperatures at the wafer sites corresponding to the respective elements of the 2-D detection array 145. After calculating the temperature, the computer 160 regulates the temperature distribution. The computer may direct the wafer chuck heater controller 180A to adjust the power delivered to the multi-element substrate heater 181A to cause the substrate temperature to become either more or less uniform. The computer 160 may also direct the wafer chuck cooler controller 180B to adjust the multi-element substrate cooler 181B to cause the substrate temperature to become more or less uniform. To regulate cooling, the multiple element substrate cooler 181B within the wafer chuck includes plural channels through which the flow of a coolant is controlled by the wafer chuck cooler controller 180B. In an alternate embodiment, an array of thermoelectric coolers are embedded in the chuck.

Although the above discussion has assumed a spectral resolution of 30 nm, it is possible to obtain a spectral resolution of 3 nm if the measurement speed (i.e., the interrogation or sampling frequency) is reduced by an order of magnitude. This reduction in measurement speed produces system response times of 20 msec to 1 sec depending upon the light source (and the modulation frequency for lock-in detection). In general, the S/N ratio is greater when using the SRS mode rather than the DRS mode (in particular, for silicon wafer temperature measurement). However, in the event that the S/N ratio is low, it can be improved by using the lock-in amplifier 150. The light source is modulated (e.g., using a mechanical chopper which communicates with the computer 160) and the resultant signal is amplified by the lock-in amplifier 150. In this manner, the signal can be extracted from the noise by observing the response occurring at the frequency determined by the chopper 105. However, the speed of the measurement becomes limited by the frequency of the mechanical chopper 105 (coupled to the broadband light source 100) and the subsequent lock-in amplifier 150.

In an alternate embodiment, the broad spectrum light source 100 shown in FIG. 4 includes plural infrared (IR) LEDs, because they are capable of responding to significantly higher modulation frequencies. For that reason, they can greatly improve the measurement speed. Accordingly, any other IR light source compatible with a high modulation frequency and having a broad spectrum output may also be used.

In still another embodiment, light source 100 in FIG. 4 is replaced by an array comprising on the order of ten laser diodes (e.g., $InGa_xP_{1-x}$ laser diodes with different values of the parameter x), each of which emits IR radiation over a very narrow range of wavelengths. The wavelength emitted by the nth laser diode is approximately given by $\lambda(n)=1.00+(0.04)n$ μm where n is an integer with a value between 0 and approximately 9, but other relationships between the emitted wavelengths are possible. Consequently, the ten laser diodes provide ten approximately equally separated wavelengths that span the range of wavelengths of interest for this application (approximately 1.00 to 1.35 μm); so the AOTF 140, RF driver 141, and prism 184 are not necessary. However, RF driver 141 is replaced in this embodiment by a multi-output diode controller that sequentially causes one (and only one) of the approximately ten laser diodes to emit IR radiation.

Lastly, the high speed measurement (update time<100 msec) of substrate temperature at a multiplicity of pre-arranged spatial locations on the substrate enables the chamber thermal characteristics to be optimized at the substrate. Moreover, with this rapid temporal response, it is possible to adjust the spatial distribution of the substrate temperature as the wafer is being processed.

Only a fraction of the light at each wavelength is passed through the substrate and reflected from the second substrate surface, whereupon it is received by the analyzer (e.g., a spectrometer). The AOTF 140 is capable of rapidly tuning the pass-band wavelength across the pre-selected spectral range (e.g., from approximately 1.00 μm to 1.35 μm). For each wavelength in the scan sequence the reflected light intensity is recorded using the 2-D detection array 145 shown in FIG. 4. The temperature at each measurement site on the substrate 135 is then obtained from the reflection spectrum using any of several known techniques to obtain a pre-determined calibration curve.

As already described, the system uses a broad band light source 100 (e.g., (1) a tungsten-halogen stabilized light source, or (2) an array of IR LEDs, or (3) an array of laser diodes). Due to the physical size of a conventional lamp filament, the coupling efficiency of the light into the AOTF 140 is low. Furthermore, if there are n measurement sites, only 1/n of the light intercepted by the AOTF 140 is coupled to the optical fibers 199A for each measurement site. Therefore, the lock-in amplifier 150 is generally required. When using a tungsten-halogen stabilized lamp, the light source is modulated at 1 to 2 kHz using the mechanical chopper 105. Lock-in detection is used to remove the incoherent signal (i.e., noise) due to any ambient background light that may impinge on the 2-D detection array 145 shown in FIG. 4. An advantage to using the tungsten-halogen stabilized light source is its relatively low cost, and its ability to provide a continuous spectrum across the spectral range of interest, (e.g., 1.00 μm to 1.35 μm). However, as stated, the tungsten-halogen lamp is less efficient in coupling light to the optical fibers 199A than some other sources (e.g., laser diodes).

An important part of a lock-in amplifier is a low-pass filter, which may be characterized either by its upper half-power frequency (i.e., −3 dB frequency) or its time constant. The time constant is ½ $\pi f_c$, where $f_c$ is the −3 dB or cutoff frequency of the filter. Traditionally, the low-pass filters of lock-in amplifiers have been characterized by their time constant. (The concept of a time-constant is relevant here, because the output of the lock-in amplifier will be relatively time-independent.) The time-constant reflects how slowly the output responds to a change in the input, and, consequently, the degree of smoothing. A greater time-constant causes the output signal to be less affected by spurious causes and, therefore, to be more reliable. Hence, a trade-off must be considered because real changes in the input signal take many time constants to be reflected at the output. This is because a single-section RC filter requires about 5 time constants to settle to its final value. It is obvious that faster measurements require shorter time-constants and, therefore higher cutoff frequencies for the filters. Therefore, the conventional chopper at a chopping frequency of approximately 1 kHz provides a response time of approximately 5 msec for each wavelength increment at each measurement site. Hence, such a mechanical chopper-based design is a suitable for measurement of the substrate temperature every 50 msec for each selected band of IR wavelengths. (This result assumes measurements at ten sites and that the data extraction algorithm requires approximately 0.01 msec per measurement.). Therefore, for ten measurement sites and ten wavelength increments, approximately 500 msec is required for a complete scan of the substrate. An alternate embodiment obtains the data for all measurement sites and all wavelength increments according to other protocols.

Due to limitations imposed by the mechanical chopper 105, the modulation frequency is constrained to values much lower than those attainable with LEDs. LEDs, operating in the range of wavelengths between 1.00 μm and 1.35 μm, typically have a spectral bandwidth of 10 to 30 nm. Therefore, approximately 9 to 10 LEDs will be necessary to span the wavelengths of interest. For improved S/N ratio, lock-in detection can be used wherein LEDs may be modulated at up to 200 MHz (a significant improvement over the combination of the mechanical chopper 105 and the tungsten-halogen broad band light source). Hence, the LEDs can solve many of the issues related to speed and light coupling. Although LEDs have considerably less total optical power than a typical tungsten-halogen light source, their power output in the portion of the spectrum of interest here is comparable. One additional advantage to using LEDs is that a separate LED per optical port (or channel) may be used to improve the S/N ratio. A disadvantage of using LEDs is their potentially reduced stability and cost. Either way, the background light source spectrum will be recorded as the reference spectrum at each measurement interval and each measurement site.

Use of a modulation frequency of approximately 100 kHz can provide a response time for each measurement on the order of 0.05 msec, which corresponds to about 0.06 msec per measurement when the data acquisition time is included. Hence, it is possible to obtain a total measurement response time of approximately 6 msec for ten wavelength increments and ten measurement sites.

In an alternate embodiment, plural parallel processors are used to acquire data from each element or detector simultaneously, hence reducing the measurement speed by a factor approximately equivalent to the number of measurement sites.

Method for Extracting Temperature Information

An important part of any technology relating to band-gap thermometry is the method of extracting temperature from the spectra. The present invention utilizes a digital filter that is based upon a higher-order derivative of the spectrum. Other means of extraction (e.g., a method based on wavelet transforms) may be possible. The primary advantage of the digital filter is its speed. This is important for achieving the 10 to 100 msec update times for fine-grain control. Current band-edge thermometry technology updates temperature on the order of once per second, in which case the computational speed of current personal computers is not an issue. The present invention, however, increases the measurement frequency by at least a factor of ten, without approaching the computational limits of those computers.

By providing accurate measurements, the system can use the substrate's temperature as a feedback in a control loop. Thus, the present invention provides a method to control the temperature distribution on a substrate during processing. In conjunction with the system described in the co-pending patent application entitled "Multi-zone resistance heater, U.S. Ser. No. 60/156,595" the contents of which are incorporated herein by reference, the multi-site temperature measurement system can provide an improved feedback control of substrate temperature. In that combination, the control signal is used to adjust the heating and/or cooling of individual zones (or sectors) pre-designed within the chuck (or substrate holder). Due to the speed of the measurement system (<100 msec) relative to the thermal response to heating/cooling adjustments (~1–2 seconds), information obtained from successive temperature measurements (e.g., rate of change or first derivative of the temperature with respect to time) can provide information to the design of a robust control algorithm.

Figure 10:
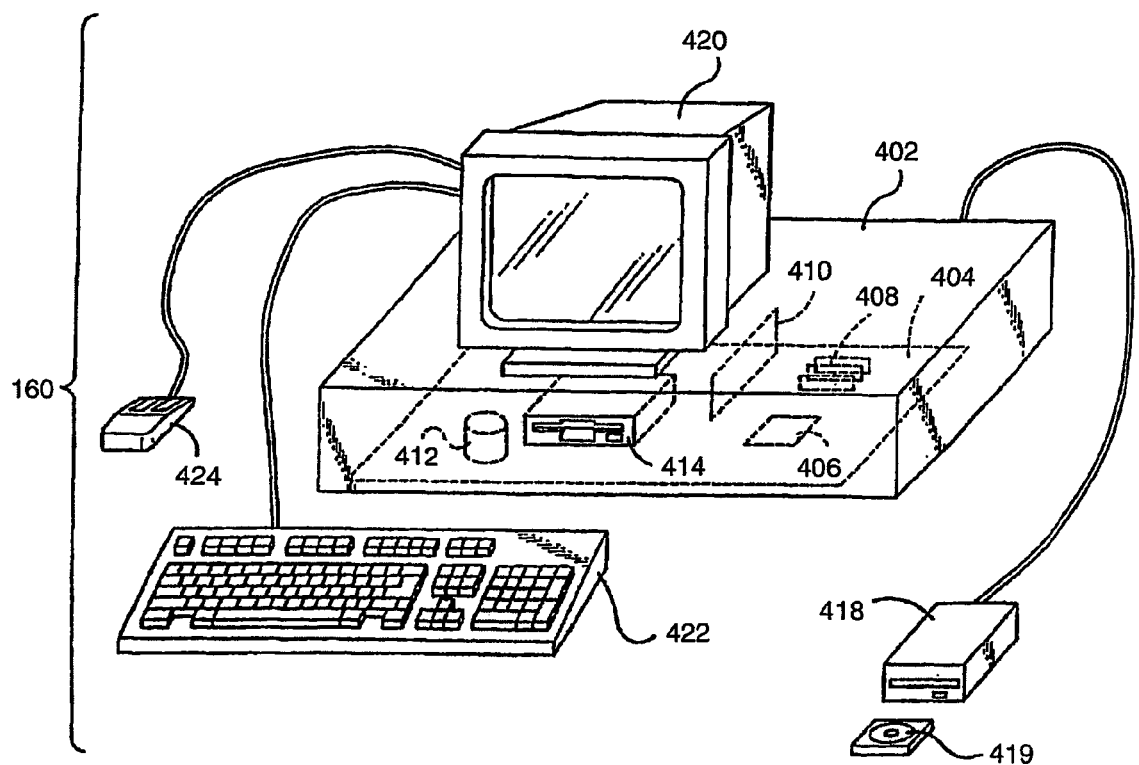
FIG. 10 is a schematic illustration of a computer.

A computer system 160 shown in FIG. 10 monitors the temperature and signals any combination of heating and/or cooling zones to increase or decrease the current heat flux. In particular, the power to each heating or cooling element and/or the coolant flow rate can be adjusted to provide for the designated heat flux either into or out of an individual zone. The computer 160 of FIG. 10 implements the method of the present invention, wherein the computer housing 402 houses a motherboard 404 which contains a CPU 406, memory 408 (e.g., DRAM, ROM, EPROM, EEPROM, SRAM, SDRAM, and Flash RAM), and other optional special purpose logic devices (e.g., ASICs) or configurable logic devices (e.g., GAL and re-programmable FPGA). The computer 160 also includes plural input devices, (e.g., a keyboard 422 and mouse 424), and a display card 410 for controlling monitor 420. In addition, the computer system 160 further includes a floppy disk drive 414; other removable media devices (e.g., compact disc 419, tape, and removable magneto-optical media (not shown)); and a hard disk 412, or other fixed, high density media drives, connected using an appropriate device bus (e.g., a SCSI bus, an Enhanced IDE bus, or a Ultra DMA bus). Also connected to the same device bus or another device bus, the computer 160 may additionally include a compact disc reader 418, a compact disc reader/writer unit (not shown) or a compact disc jukebox (not shown). Although compact disc 419 is shown in a CD caddy, the compact disc 419 can be inserted directly into CD-ROM drives which do not require caddies. In addition, a printer (not shown) also provides printed listings of the temperature of the substrate, in one or more dimensions over time.

As stated above, the system includes at least one computer readable medium. Examples of computer readable media are compact discs 419, hard disks 412, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 160 and for enabling the computer 160 to interact with a human user. Such software may include, but is not limited to, device drivers, operating systems and user applications, such as development tools. Such computer readable media further include the computer program product of the present invention for measuring the temperature of a substrate. The computer code devices of the present invention can be any interpreted or executable code mechanism, including but not limited to scripts, interpreters, dynamic link libraries, Java classes, and complete executable programs.

Obviously, numerous modifications and variations of the present invention are possible in light of the above teachings. It is therefore to be understood that, within the scope of the appended claims, the invention may be practiced otherwise than as specifically described herein.

The invention claimed is:

1. An apparatus for measuring temperatures of plural physically separated locations on a substrate in a plasma processing system, comprising:
    a substrate holder for holding a substrate to be processed in the plasma processing system, the substrate to be processed on a first side opposite to a second side of the substrate that is in contact with the substrate holder;
    a broad band light source for coupling plural light beams to be incident on plural discrete reflection points on the second side of the substrate, said broad band light source emitting at least a range of wavelengths for which absorption by the substrate changes from absorption of essentially all light entering the substrate to absorption of essentially no light incident on the substrate;
    a light collection system having a plurality of light collecting elements each for collecting from the second side of the substrate a portion of a respective one of the plural light beams reflected at the plural reflection points during plasma processing of the first side of the substrate;
    plural optical fibers provided within a chamber of said plasma processing system, two of such fibers passing through said substrate holder and having a terminal end adjacent to said second side of the substrate and each other, one of the two fibers having a first end coupled to the broad band light source, and the other of the two fibers having a first end coupled to the light collection system; and
    a computer configured to calculate two dimensional temperature of said substrate based on the plural light beams, wherein the apparatus does not include a pyrometry based temperature sensor.

2. The apparatus as claimed in claim 1, further comprising an acousto-optic tunable filter interposed between the light source and the substrate holder.

3. The apparatus as claimed in claim 1, wherein the light collection system comprises plural photodiodes.

4. The apparatus as claimed in claim 1, wherein the light collection system comprises a charge-coupled device array.

5. The apparatus as claimed in claim 1, wherein the light collection system comprises a charge-injection device array.

6. The apparatus as claimed in claim 1, wherein the light collection system comprises a central light detector.

7. The apparatus as claimed in claim 1, wherein the light collection system comprises plural, physically separated light collectors.

8. The apparatus as claimed in claim 1, wherein the plasma processing system is an inductively coupled plasma processing system.

9. The apparatus as claimed in claim 1, wherein the plasma processing system is a capacitively coupled plasma processing system.

10. The apparatus as claimed in claim 1, wherein the plasma processing system is both a capacitively coupled and an inductively coupled plasma processing system.

11. The apparatus as claimed in claim 1, further comprising a reflectance detection circuit for detecting reflectance from which temperature is determined.

12. The apparatus of claim 1, wherein said apparatus does not detect black body radiation from the substrate.

13. The apparatus of claim 1, wherein at least one of said plural optical fibers is coupled from an exterior to an interior of said chamber through a fiber optic feed through or an optical vacuum feed through.

14. The apparatus as claimed in claim 1, further comprising an error detection circuit for detecting a temperature difference between (1) a measured temperature of a portion of the substrate corresponding to a location of one of the plural reflection points and (2) a target temperature for the portion of the substrate corresponding to the location of the one of the plural reflection points.

15. The apparatus as claimed in claim 14, wherein the substrate holder comprises at least one of a heating element and a cooling element for changing a temperature of the portion of the substrate corresponding to the location of the one of the plural reflection points based on an output of the error detection circuit.

16. The apparatus as claimed in claim 14, wherein the substrate holder comprises at least one of a heating element and a cooling element for changing a temperature of a portion of the substrate not corresponding to the location of the one of the plural points based on an output of the error detection circuit.

17. The apparatus as claimed in claim 14, further comprising at least one digital filter configured using a higher-order derivative of a spectrum.

18. The apparatus as claimed in claim 1, wherein the light source comprises a modulated light source.

19. The apparatus as claimed in claim 18, wherein the modulated light source comprises a mechanically modulated light source.

20. The apparatus as claimed in claim 19, wherein the mechanically modulated light source comprises a mechanical chopper.

21. The apparatus as claimed in claim 18, wherein the modulated light source comprises an electrically modulated light source.

22. The apparatus as claimed in claim 21, wherein the electrically modulated light source comprises plural LEDs.

23. The apparatus as claimed in claim 21, wherein the electrically modulated light source comprises plural lasers.

24. A method for measuring temperatures of plural physically separated locations on a substrate in a plasma processing system, comprising:
positioning a substrate to be processed on a substrate holder in the plasma processing system, the substrate to be processed on a first side opposite to a second side of the substrate that is in contact with the substrate holder;
coupling plural light beams from a broad band light source to be incident on plural discrete reflection points on the second side of the substrate, said broad band light source emitting a range of wavelengths for which absorption by the substrate changes from absorption of essentially all light entering the substrate to absorption of essentially no light incident on the substrate, said coupling comprising coupling the plural light beams via a first set of plural respective optical fibers, two of such fibers passing through the substrate holder and having a terminal end adjacent to said second side of the substrate;
collecting from the second side of the substrate a portion of each of the plural light beams reflected at the plural reflection points using a light collection system during plasma processing of the first side of the substrate, said collecting comprising collecting a portion of each of the reflected plural light beams via a second set of plural respective optical fibers, two of such fibers passing through the substrate holder and each having a terminal end adjacent to said second side of the substrate and adjacent to a respective terminal end of the optical fibers of the first set; and
calculating two dimensional temperature information of said substrate based on the plural light beams wherein the method does not include detecting a pyrometry based temperature measurement of the substrate.

25. The method as claimed in claim 24, the method further comprising interposing an acousto-optic tunable filter between the light source and the substrate holder.

26. The method as claimed in claim 24, wherein the light collection system comprises plural photodiodes.

27. The method as claimed in claim 24, wherein the light collection system comprises a charge-coupled device array.

28. The method as claimed in claim 24, wherein the light collection system comprises a charge-injection device array.

29. The method as claimed in claim 24, wherein the light collection system comprises a central light detector.

30. The method as claimed in claim 24, wherein the light collection system comprises plural, physically separated light collectors.

31. The method as claimed in claim 24, wherein the plasma processing system is an inductively coupled plasma processing system.

32. The method as claimed in claim 24, wherein the plasma processing system is a capacitively coupled plasma processing system.

33. The method as claimed in claim 24, wherein the plasma processing system is both a capacatively coupled and an inductively coupled plasma processing system.

34. The method as claimed in claim 24, the method further comprising detecting reflectance by a reflectance detection circuit from which temperature is determined.

35. The method of claim 24, further comprising not detecting black body radiation from the substrate.

36. The method of claim 24, wherein said coupling comprises coupling at least one of the plural light beams from an exterior of a chamber of the plasma processing system to an interior of the chamber via a fiber optic feed through or an optical vacuum feed through.

37. The method as claimed in claim 24, the method further comprising detecting by an error detection circuit a temperature difference between (1) a measured temperature of a portion of the substrate corresponding to a location of one of the plural reflection points and (2) a target temperature for the portion of the substrate corresponding to the location of one of the plural reflection points.

38. The method as claimed in claim 37, the method further comprising changing a temperature of a portion of the substrate using a heating element and a cooling element, the portion of the substrate corresponding to the location of the one of the plural points based on an output of the error detection circuit.

39. The method as claimed in claim 37, the method further comprising changing a temperature of a portion of the substrate using a heating element and a cooling element, the portion of the substrate not corresponding to the location of the one of the plural points based on an output of the error detection circuit.

40. The method as claimed in claim 37, the method further comprising configuring at least one digital filter using a higher-order derivative of a spectrum.

41. The method as claimed in claim 24, the method further comprising modulating the light source.

42. The method as claimed in claim 41, the method further comprising mechanically modulating the light source.

43. The method as claimed in claim 42, the method further comprising modulating the light source by mechanically chopping the light source.

44. The method as claimed in claim 41, the method further comprising electrically modulating the light source.

45. The method as claimed in claim 44, the method further comprising electrically modulating the light source using plural LEDs.

46. The method as claimed in claim 44, the method further comprising electrically modulating the light source using plural lasers.

* * * * *

UNITED STATES PATENT AND TRADEMARK OFFICE
CERTIFICATE OF CORRECTION

PATENT NO.        : 7,234,862 B2
APPLICATION NO. : 10/398652
DATED             : June 26, 2007
INVENTOR(S)       : Johnson et al.

Page 1 of 1

It is certified that error appears in the above-identified patent and that said Letters Patent is hereby corrected as shown below:

On the title page, Item (87), the PCT Publication information is incorrect. Item (87) should read:
-- PCT Pub. No.: WO 02/33369 --

Signed and Sealed this

Eighteenth Day of September, 2007

JON W. DUDAS
*Director of the United States Patent and Trademark Office*